United States Patent [19]
Friggstad

[11] Patent Number: 5,303,779
[45] Date of Patent: Apr. 19, 1994

[54] ROCKSHAFT CULTIVATOR FRAME

[75] Inventor: Terrance Friggstad, Saskatoon, Canada

[73] Assignee: Flexi-Coil Limited, Saskatoon, Canada

[21] Appl. No.: 969,380

[22] Filed: Oct. 30, 1992

[30] Foreign Application Priority Data

Mar. 24, 1992 [CA] Canada ................................ 2067081

[51] Int. Cl.⁵ .............................................. A01B 49/00
[52] U.S. Cl. ...................................... 172/311; 172/456
[58] Field of Search ................. 172/311, 456; 403/165

[56] References Cited

U.S. PATENT DOCUMENTS

| | | | |
|---|---|---|---|
| 893,274 | 7/1908 | Starrett | 403/165 X |
| 3,470,965 | 10/1969 | Quickstad | 172/456 X |
| 3,536,144 | 10/1970 | Hood et al. | 172/311 |
| 4,509,602 | 4/1985 | Russ | 172/311 |
| 5,178,328 | 1/1993 | Broyhill | 172/311 X |

Primary Examiner—Randolph A. Reese
Assistant Examiner—Christopher J. Novosad
Attorney, Agent, or Firm—D. Ron Morrison

[57] ABSTRACT

The present invention relates to an agricultural cultivator frame having a center and two wing sections pivotally attached to the center section for rotation about horizontal axes in the direction of travel for movement between a substantially horizontal field or working position and a substantially vertical transport position. Support wheels are attached adjustably to the frame by a transverse rockshaft extending the width of the cultivator and controlling the elevation of the frame above ground level. The hitch is pivotally attached to the frame for automatic leveling. The rockshaft wing sections are connected to the rockshaft center section by a universal joint. The rockshaft wing sections are pivotally attached to the wing section for movement about multiple axes and provide for longitudinal displacement relative to the frame.

3 Claims, 8 Drawing Sheets

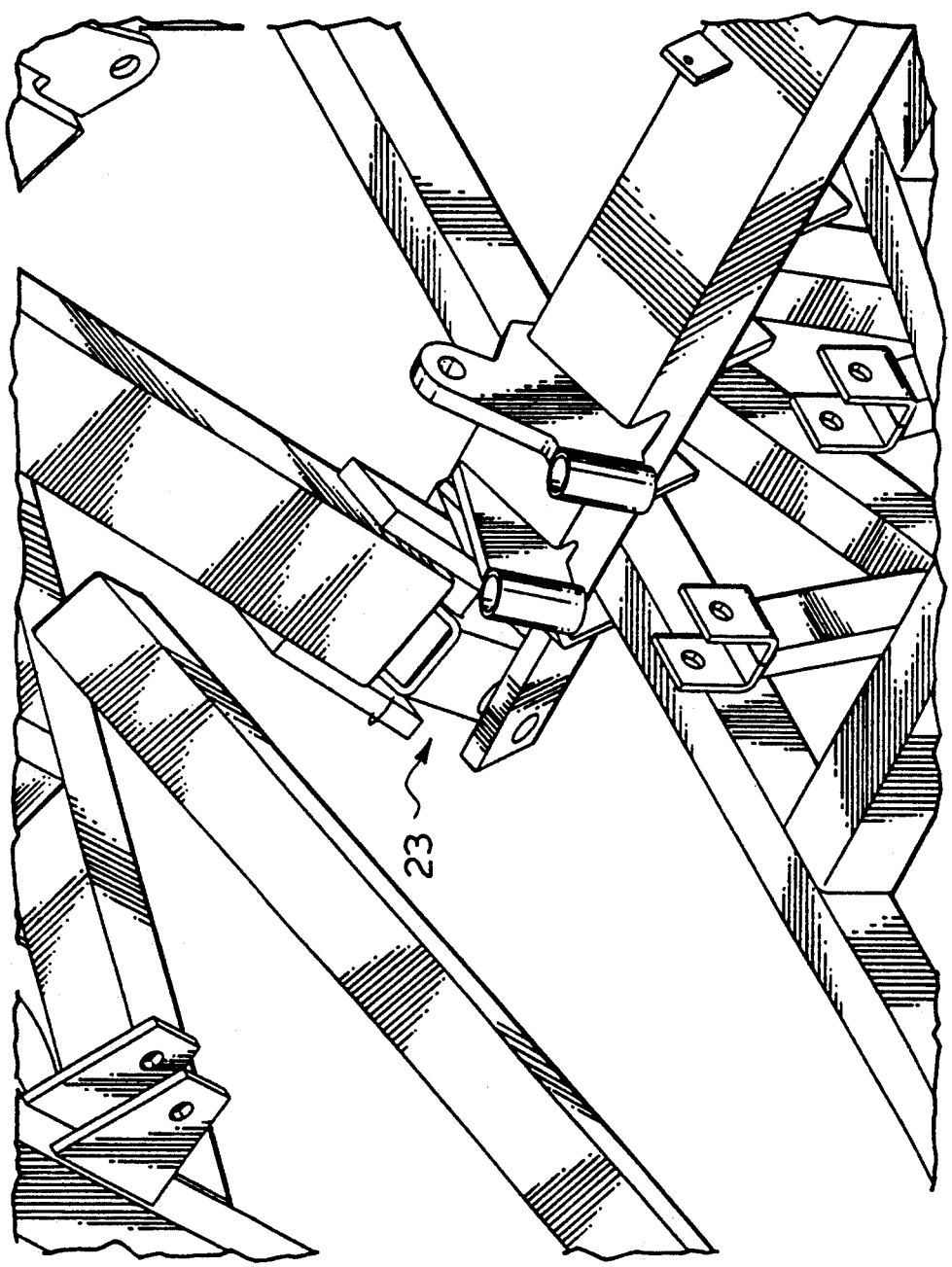

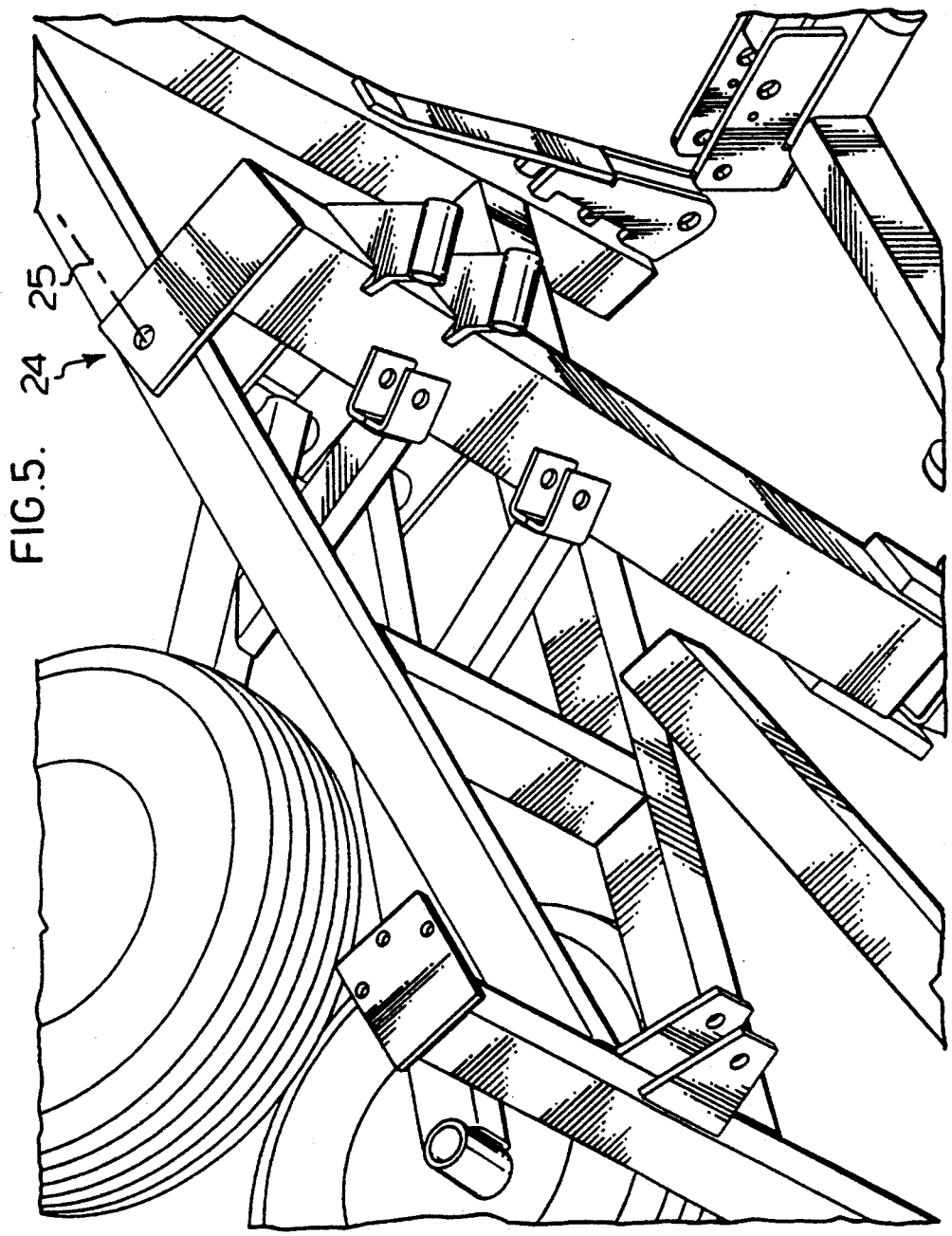

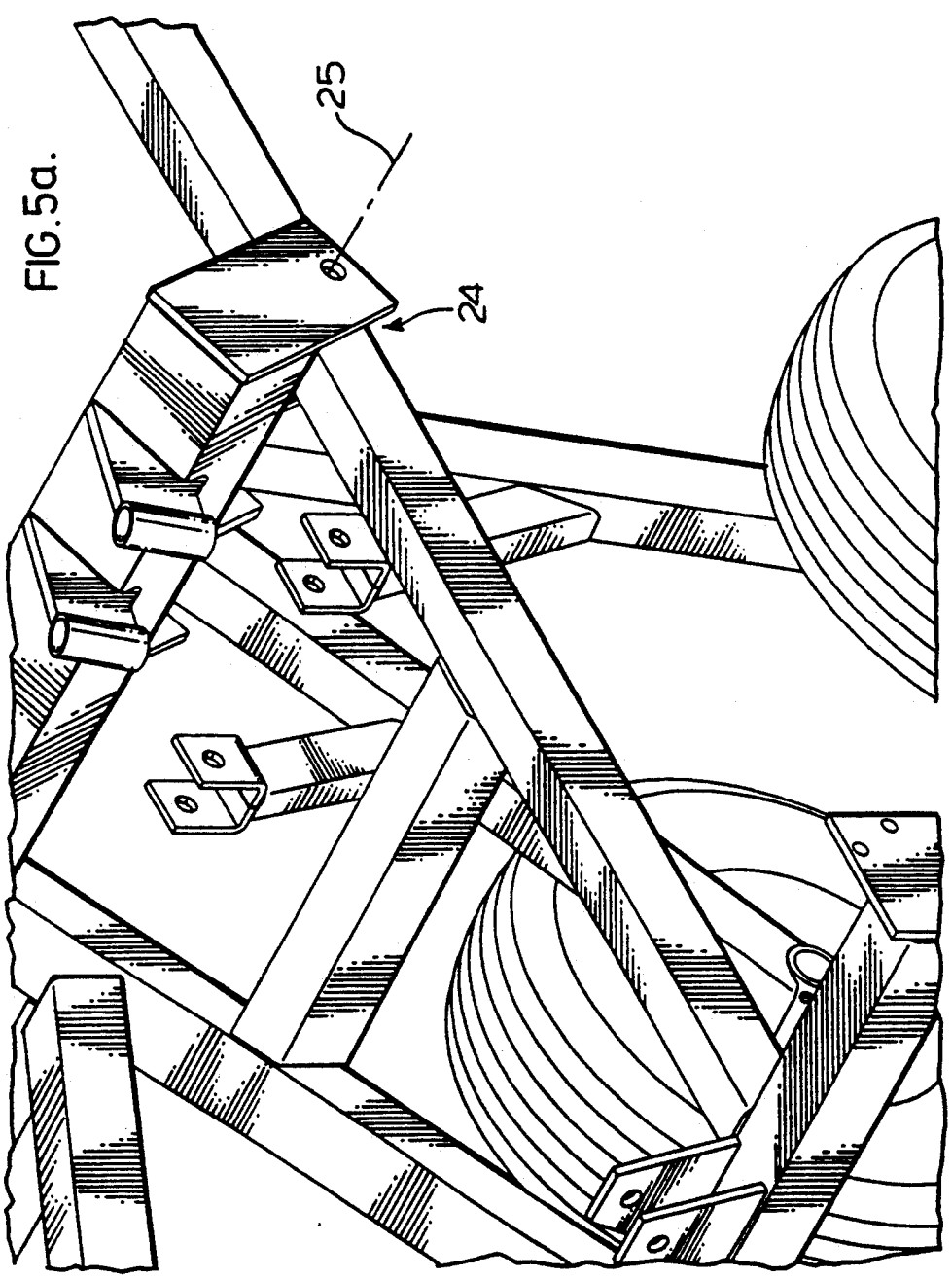

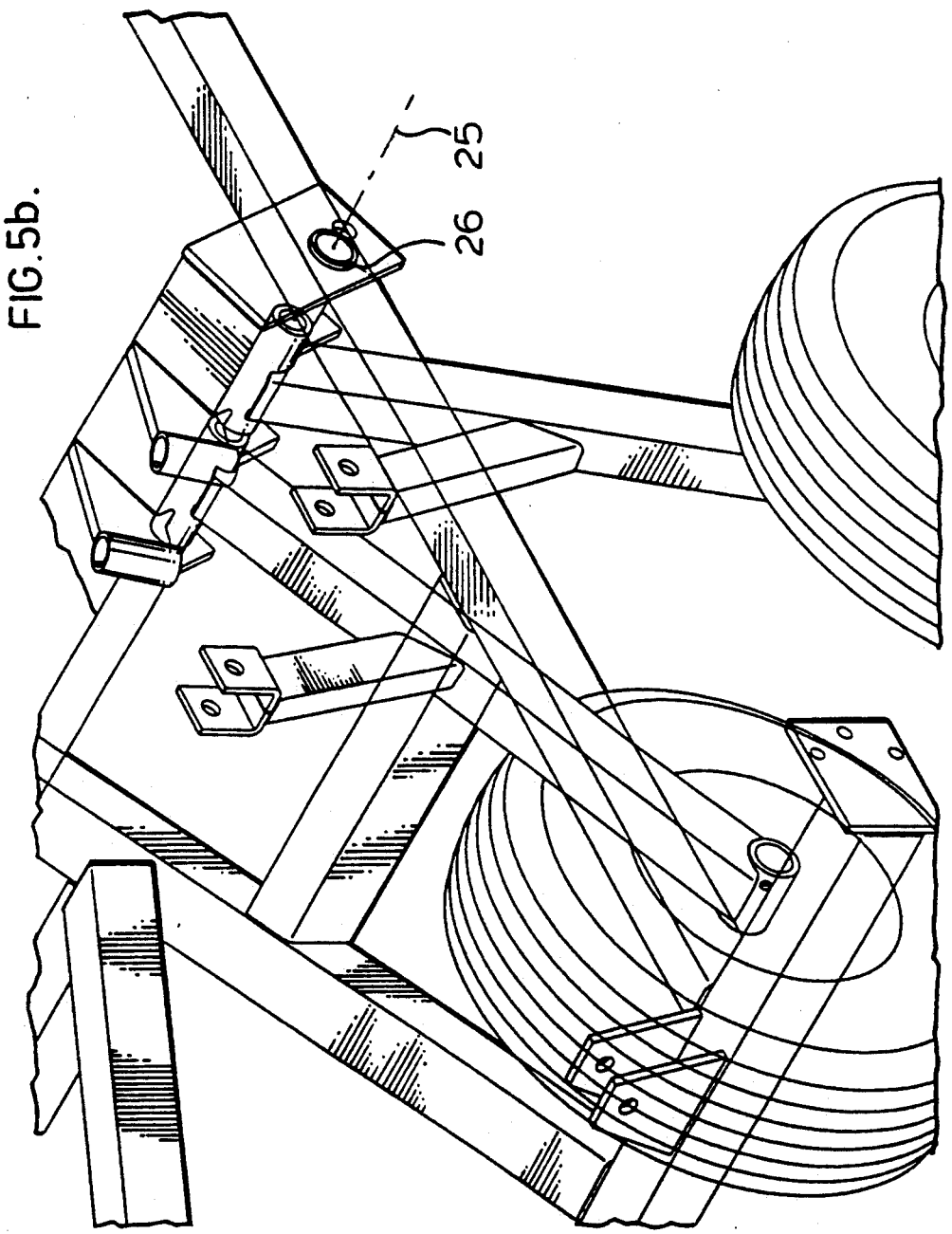

(1)

ROCKSHAFT CULTIVATOR FRAME

BACKGROUND OF THE INVENTION

It is well known in the art to provide for cultivator frames having a centre section and wing sections pivotally connected together along an axis parallel to the direction f travel so that upon actuation of hydraulic or other mechanisms the wing section may be rotated from a substantially horizontal field position to a substantially vertical position for transport.

It is also known to support such cultivator frames on a multiplicity of wheels.

Adjustment of the height of the cultivator frame above the ground in field position and for transport purposes has previously been accomplished by a variety of mechanisms all of which are complicated and expensive to manufacture and prone to failure.

In one variety of such cultivator frames the mechanism for raising and lowering the frame is centred around a rockshaft pivotally attached to the cultivator frame and from which a variety of wheel mechanisms is mounted for rotational displacement about the axis of the rockshaft. Prior mechanisms however, require very complex and ineffective mechanisms to provide for such rotation while maintaining the cultivator frame level to the ground.

SUMMARY OF THE INVENTION

The present invention is an agricultural cultivator frame comprising a rectangular, planar, generally horizontal, centre frame section, supported by a pair of co-axial wheel means and hitch means adapted to be attached to a tractor or other farm implement, a pair of planar, rectangular wing frame sections, each pivotally attached on a respective side of the centre section for rotation about first axes parallel to the direction of travel and supported by the said centre section and further wheel means, means to rotate each said wing frame section about its corresponding said first axis between a field position wherein the wing section is substantially coplanar with the centre section and a transport position wherein the wing section is substantially vertical, adjustment means to adjust the relative angle between the centre frame section and the said hitch means to permit the centre frame section to remain at a predetermined angle to the ground, first rockshaft means supporting the said centre frame section on said pair of co-axial wheel means and pivotally attached to said centre section at at least two locations for rotation about a transverse axis, through the frame at a location offset from, and parallel to, the axis of the centreline along the length of the rockshaft a pair of second rockshaft means each supporting respective ones of said wing sections on respective ones of said further wheel means and each pivotally attached to respective ones of said wing sections at a single location for rotation about said transverse axis, universal joint means having two axes of rotation at right angles to, and spaced from, one another, interconnecting the said first and each of said second rockshaft means, and means to provide for relative transverse motion between said second rockshafts and corresponding ones of said wing sections.

In a preferred form, the invention additionally comprises a cultivator frame having means to provide for relative rotational motion between said second rockshaft means and corresponding ones of the wing sections. Most preferably, the means to provide for rotational motion is a sliding ball joint.

DRAWINGS

In the drawings:

FIG. 4 is an enlarged perspective view of one part of the cultivator frame of FIG. 1, namely the universal joint between the centre section rockshaft and the left wing section rockshaft which is in the transport (raised wing) position;

FIG. 5 is a perspective view of the connection between the left wing frame section and the outer end of the left wing rockshaft, which is in the raised transport position;

FIG. 5a is a perspective view of the connection between the right wing frame section and the outer end of the right wing rockshaft, which is in the field position, indicating more specifically the location of a sliding ball joint connection between the frame and the rockshaft;

FIG. 5b repeats 5a and adds one detail.

Some of the foregoing Figures are copies from computer generated drawings which can show hidden lines that must be deleted for true perspective but which in some instances in the foregoing Figures are left in place to assist in identifying locations; also, many lines outlining unessential parts are deleted from the Figures to improve clarity of the remaining parts.

PREFERRED EMBODIMENT

Figure 1:
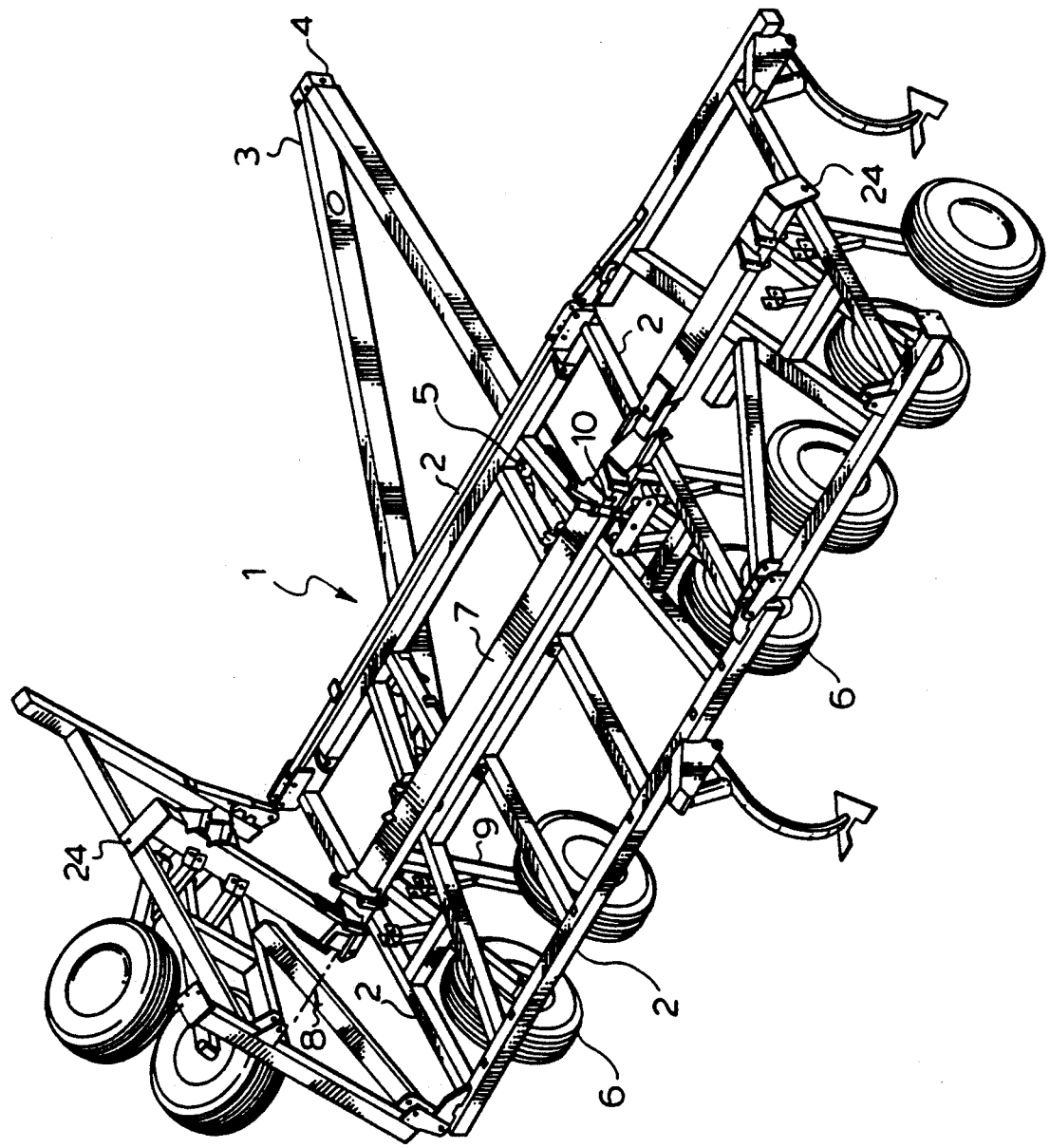
FIG. 1 is a perspective view showing essential parts of the preferred form of the agricultural cultivator frame of the present invention, with one wing (the right) in field position and the other (left) raised for transport.
Figure 2:
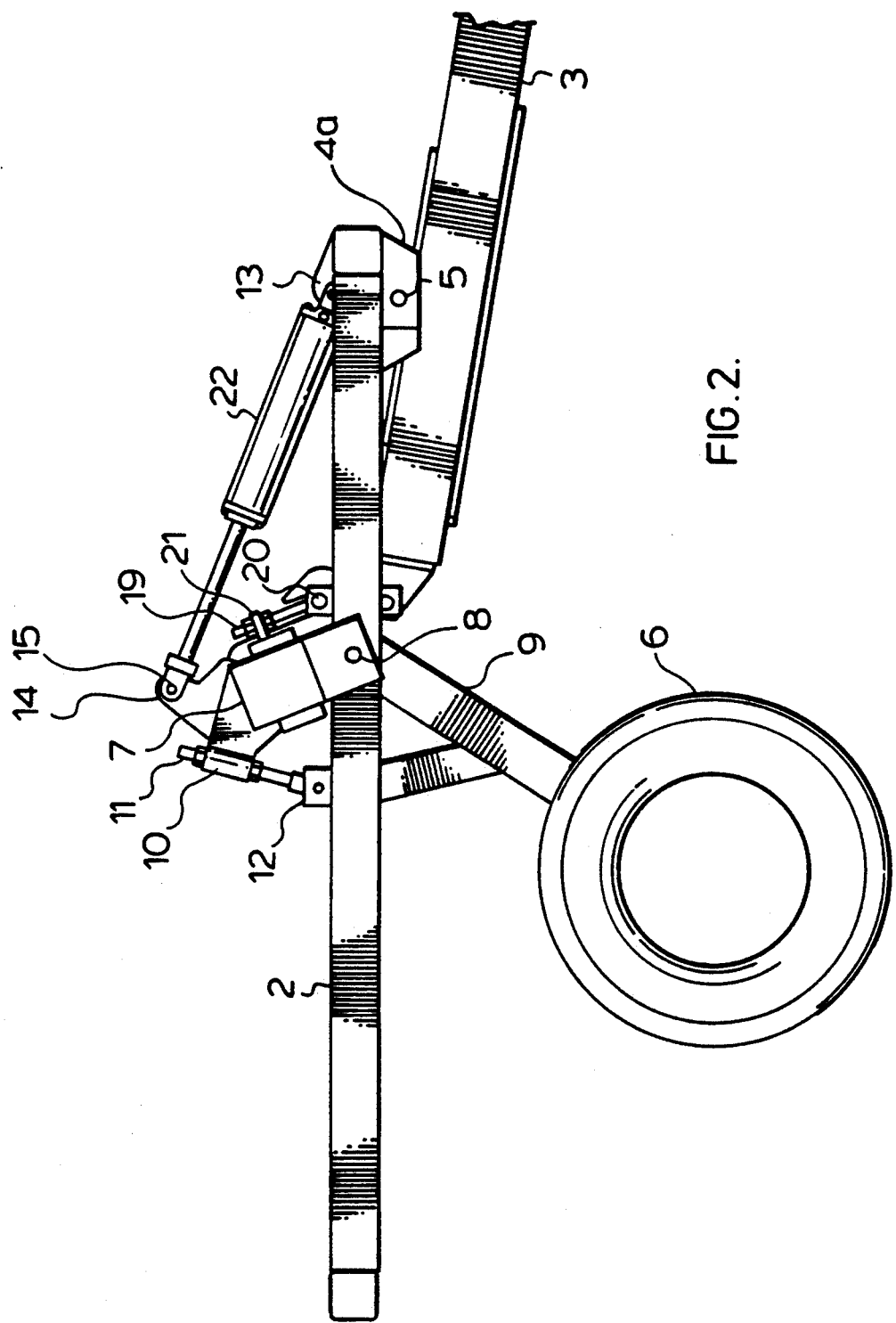
FIG. 2 is an end view of the centre section of the rockshaft and cultivator frame shown in FIG. 1, when the frame is in the fully raised transport position.
Figure 3:
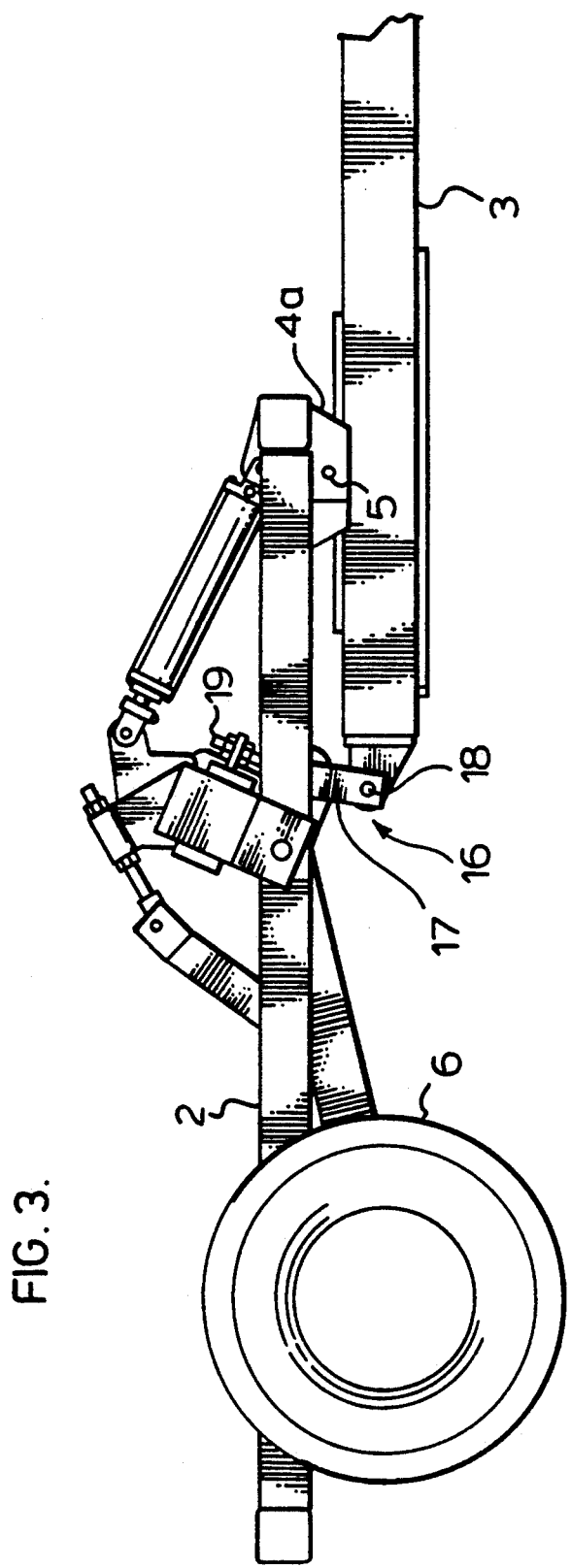
FIG. 3 is an end view of the centre section of the rockshaft and cultivator frame shown in FIG. 1, when the frame is in its fully lowered field or working condition.

Referring now to FIGS. 1, 2 and 3, a preferred embodiment of the rockshaft cultivator frame of the present invention is generally referred to as 1. The rectangular centre section 2 of the rockshaft cultivator frame is attached to a source or mode of power such as a tractor by a hitch generally referred to as 3, having a forward portion 4 and being pivotally attached to the centre section 2 at depending pivotal mounts 4a for rotation about a transverse horizontal hitch axis 5 between the fully lowered position shown in FIG. 3 and the fully raised transport position shown in FIG. 2. The centre section is supported above the ground by a series of wheels 6, preferably in two pairs which are axially aligned by means of a rockshaft 7 pivotally attached to the central section for rotational movement about a horizontal transverse axis 8. It should be noted that this axis 8 passes transversely through each planar frame at a location offset from, and parallel to, the centreline along the length of the rockshaft and that, when adjusting the height of the frame relative to the ground, the wheels are rotated around axis 8 and not around the longitudinal centreline of the rockshaft.

Each of the wheels is pivotally mounted to the rockshaft 7 by a wheel arm 9 for rotation also about axis 8. Rockshaft 7 is connected to wheel arm 9 by bell crank 10 comprising threaded shaft 11 and pivotal connection 12.

An extensible mechanism, preferably a hydraulic cylinder 22, is pivotally attached between the forward position 13 of the centre section 2 and bell crank 14 secured to rockshaft 7 at pivotal connection 15.

Extension and contracting of the extensible mechanism causes bell cranks 10, 14, and rockshaft 7 to pivot in unison about axis 8 thereby rotating wheel arm 9 and wheel 6 also about axis 8 and raising and lowering the centre section. Hitch 3 extends rearwardly under centre section 2 and is extensibly connected to rockshaft 7 by linkage 16. Linkage 16 includes the link 17, pivotally connected to hitch 3 for rotation about transverse axis 18 and to threaded member 19 for rotation about transverse axis 20 (FIGS. 3 and 2). The threaded member 19 is threadably received on rockshaft 7 as at 21. Adjustment of the position of threaded member 19, as by turning, adjusts the relative angle between centre section 2 and hitch 3 so as to maintain centre section 2 substantially level to the ground.

Preferably each separate wheel 6 and wheel arm 9 combination is individually adjusted as to its relative rotational position about axis 8 by corresponding sets of bell crank 10, threaded shaft 11, and pivotal connection 12.

Rockshaft 7 extends substantially co-axially across each of the wing frame sections to be pivotally mounted tot he distal side of each wing section for rotational movement about transverse axis 8 as shown in FIG. 1.

Figure 4A:
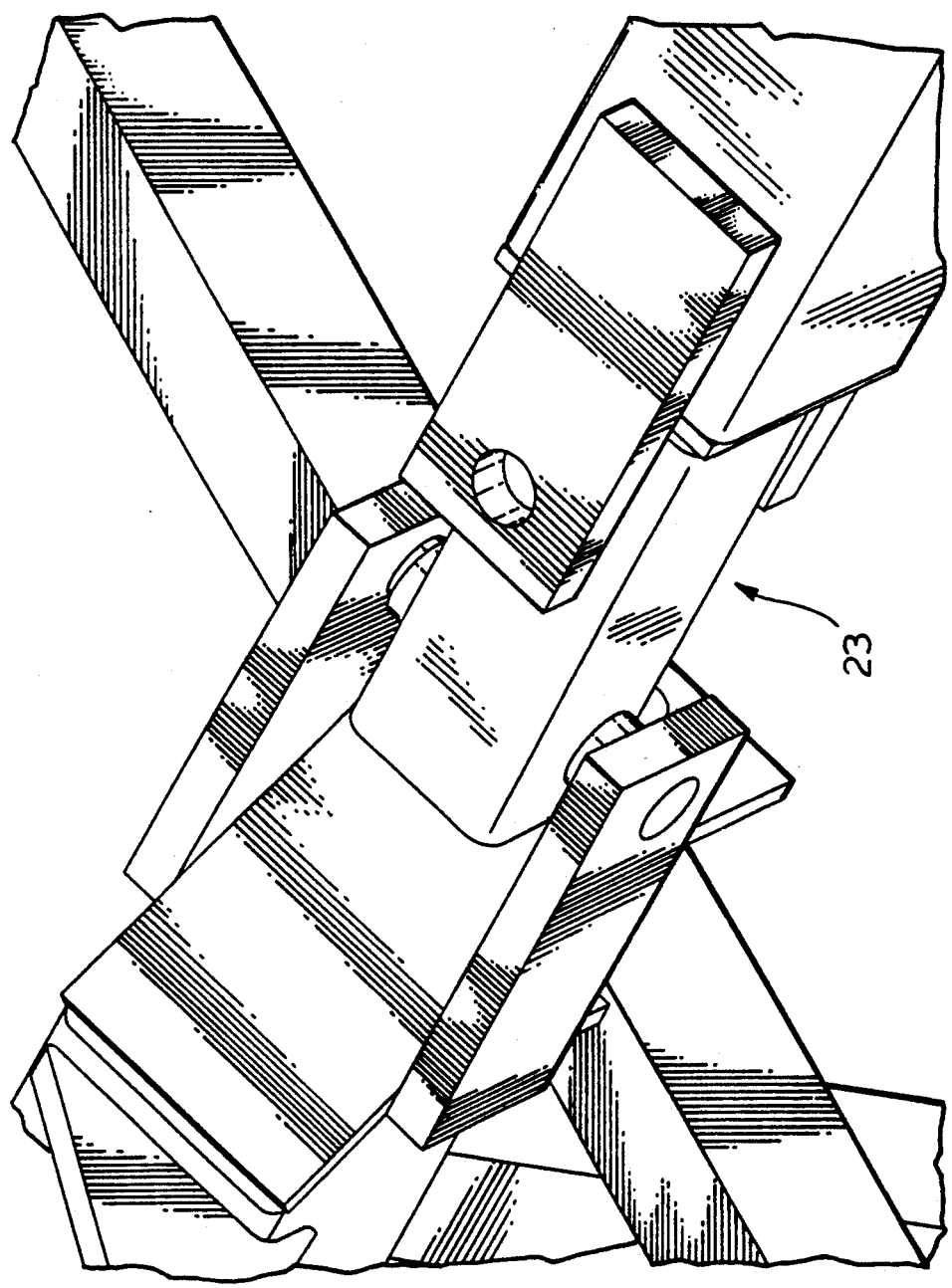
FIG. 4a is a perspective enlarged view of another part of FIG. 1, namely the universal joint between the centre section rockshaft and the right wing section rockshaft which is in the field or working (lowered) position.

The wing sections of the rockshaft 7 are rotatable around axis 8 in unison with the centre section of the rockshaft by means of universal joints, 23, adjacent the folding axis, as shown in FIGS. 4 and 4a. It should be noted also that these universal joints have two axes of rotation that are at right angles to one another but are not in a common plane, i.e. they are offset or spaced apart from one another and do not intersect.

Preferably the pivotal connection 24 between the distal end of each rockshaft wing section and its respective wing frame section can accommodate sliding relative motion along the length of the pivotal axis 25 between the rockshaft and the wing section, as well as a degree of pivotal motion about longitudinal and vertical axes, as shown in FIGS. 5 and 5a. More preferably the connection between the rockshaft and the wing section is a sliding ball joint, 26, positioned as shown in FIG. 5b but actually not visible in a normal perspective view, but outlined in FIG. 5b by computer generated hidden lines.

Numerous modifications can be made in the specific expedients described without departing from the actual invention, the scope of which is defined in the following claims.

What is claimed is:

1. An agricultural cultivator frame comprising:
   (a) a rectangular, planar, generally horizontal centre frame section, supported by
      i) a pair of co-axial wheel means and
      ii) hitch means adapted to be attached to a tractor or other farm implement,
   (b) a pair of planar, rectangular wing frame sections,
      i) each pivotally attached on a respective side of the centre section for rotation about first axes parallel to the direction of travel and
      ii) supported by the said centre section and further wheel means,
   (c) means to rotate each said wing frame section about its corresponding said first axis between:
      i) a field position wherein the wing section is substantially coplanar with the centre section and
      ii) a transport position wherein the wing section is substantially vertical,
   (d) adjustment means to adjust the relative angle between the centre frame section and the said hitch means to permit the centre frame section to remain at a predetermined angle to the ground,
   (e) first rockshaft means:
      i) supporting the said centre frame section on said pair of co-axial wheel means and
      ii) pivotally attached to said centre section at at least two locations for rotation about a transverse axis through the frame at a location offset from, and parallel to, the axis of the centreline along the length of the rockshaft,
   (f) a pair of second rockshaft means:
      i) each supporting respective ones of said wing sections on respective ones of said further wheel means and
      ii) each pivotally attached to respective ones of said wing sections at a single location for rotation about said transverse axis through the frame,
   (g) universal joint means having two axes of rotation at right angles to, and spaced from, one another interconnecting the said first and each of said second rockshaft means, and
   (h) means to provide for relative transverse motion between said second rockshaft and corresponding ones of said wing sections.

2. An agricultural cultivator frame as claimed in claim 1 further comprising means to provide for relative pivotal motion between said second rockshaft and corresponding ones of said wing sections.

3. An agricultural cultivator frame as claimed in claim 2 wherein said means to provide for rotational motion is a sliding ball joint.

* * * * *